US008029072B2

(12) United States Patent
Miyazaki et al.

(10) Patent No.: US 8,029,072 B2
(45) Date of Patent: Oct. 4, 2011

(54) BRAKE CONTROL SYSTEM AND BRAKE CONTROL METHOD

(75) Inventors: Tetsuya Miyazaki, Toyota (JP); Yoshiaki Irie, Chiryu (JP); Rio Suda, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1343 days.

(21) Appl. No.: 11/565,196

(22) Filed: Nov. 30, 2006

(65) Prior Publication Data

US 2007/0159001 A1 Jul. 12, 2007

(30) Foreign Application Priority Data

Jan. 11, 2006 (JP) ................... 2006-003757

(51) Int. Cl.
*B60T 8/34* (2006.01)
(52) U.S. Cl. ............. 303/113.4; 303/113.1; 303/122.04; 303/155; 303/186; 303/187
(58) Field of Classification Search ............... 303/113.4, 303/155
See application file for complete search history.

(56) References Cited

U.S. PATENT DOCUMENTS

| 2002/0079736 A1* | 6/2002 | Soga ............ 303/113.1 |
| 2002/0153771 A1* | 10/2002 | Obuchi ............ 303/155 |
| 2002/0180267 A1* | 12/2002 | Hara et al. ............ 303/187 |
| 2004/0183369 A1* | 9/2004 | Soga ............ 303/113.4 |
| 2004/0245850 A1* | 12/2004 | Sakai ............ 303/113.4 |
| 2005/0040700 A1 | 2/2005 | Yokoyama et al. |

FOREIGN PATENT DOCUMENTS

| DE | 101 14 599 A1 | 12/2001 |
| EP | 1 219 519 A1 | 7/2002 |
| FR | 2 872 763 A1 | 1/2006 |
| JP | 11-301434 | 11/1999 |
| JP | 11-301463 | 11/1999 |
| JP | 11-321621 | 11/1999 |
| JP | 2000-177555 | 6/2000 |
| JP | 2000-229564 | 8/2000 |
| JP | 2000-247219 | 9/2000 |
| JP | 2000-249577 | 9/2000 |
| JP | 2002-160616 | 6/2002 |
| JP | 2002-178899 | 6/2002 |
| JP | 2005-41319 | 2/2005 |
| JP | 2005-231421 | 9/2005 |
| WO | WO 97/32766 | 9/1997 |

* cited by examiner

*Primary Examiner* — Robert A. Siconolfi
*Assistant Examiner* — San Aung
(74) *Attorney, Agent, or Firm* — Oblon, Spivak, McClelland, Maier & Neustadt, L.L.P.

(57) ABSTRACT

In order to achieve a good brake feeling, a brake control system includes a master cylinder which discharges pressurized operating fluid according to an operating amount of a brake operating member by a driver, a stroke simulator which is connected to the master cylinder and creates a reaction force with respect to that operation according to the operating amount of the brake operating member, and a control portion which calculates a target deceleration using hydraulic pressure in the stroke simulator. The brake control system is also provided with a master cylinder pressure sensor that measures the hydraulic pressure in the master cylinder. The control portion may also calculate the target deceleration using an estimated value of the hydraulic pressure in the stroke simulator calculated based on the measured value from the master cylinder pressure sensor.

13 Claims, 7 Drawing Sheets

F I G . 1
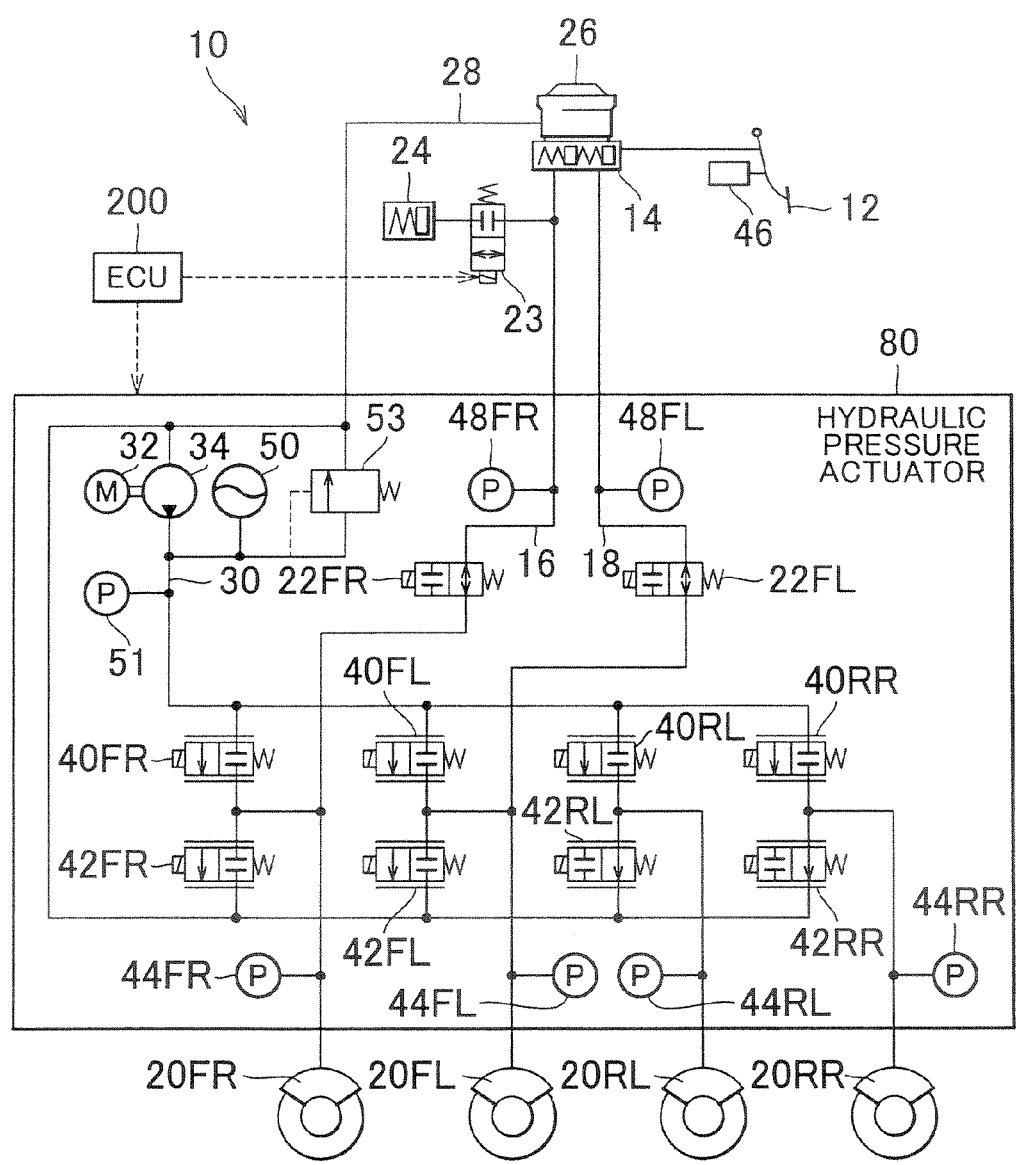

BRAKE CONTROL SYSTEM AND BRAKE CONTROL METHOD

INCORPORATION BY REFERENCE

The disclosure of Japanese Patent Application No. 2006-003757 filed on Jan. 11, 2006 including the specification, drawings and abstract is incorporated herein by reference in its entirety.

BACKGROUND OF THE INVENTION

1. Field of the Invention

The invention relates to a brake control system which controls braking force applied to a wheel provided on a vehicle.

2. Description of the Related Art

Japanese Patent Application Publication No. JP-A-2005-41319, for example, describes a known braking force control system which calculates a target deceleration based on a hydraulic pressure in a master cylinder and a pedal stroke of a brake pedal, and controls the braking force so that the target deceleration is applied to the vehicle. In this braking force control system, the target deceleration is calculated to be larger the greater the master cylinder pressure or the larger the pedal stroke. Also, a stroke simulator which creates a reaction force with respect to an operation of the brake pedal by a driver is connected to the master cylinder.

In the foregoing braking force control system, when the driver depresses the brake pedal, the hydraulic pressure in the master cylinder increases in response to the depression force and operating fluid flows out from the master cylinder to the stroke simulator. The transient response of the master cylinder pressure at this time differs depending on the speed or rate at which the brake pedal is depressed. That is, when the brake is operated suddenly, the master cylinder pressure first becomes relatively high and then drops to an equilibrium master cylinder pressure as operating fluid flows out to the stroke simulator. When the brake is operated slowly, on the other hand, the master cylinder pressure approaches the equilibrium master cylinder pressure without becoming all that high.

As a result, the master cylinder pressure immediately after the brake operating member is operated tends to become larger the more sudden an operation of the brake operating member and the faster the speed of that operation. Therefore, as the speed at which the brake operating member is operated increases the target deceleration does so, as well. As a result, the speed at which the brake operating member is operated ends up affecting the brake feeling in such a way that the braking effect is keenly felt by the driver.

SUMMARY OF THE INVENTION

In view of the foregoing problems, the present invention provides a brake control system and a brake control method that achieves a good brake feeling by mitigating the effect from fluctuation in the speed at which the brake operating member is operated.

In order to solve the foregoing problems, one aspect of the invention relates to a brake control system which a includes a master cylinder that discharges pressurized operating fluid according to an operating amount of a brake operating member by a driver, a stroke simulator which is connected to the master cylinder and creates a reaction force with respect to that operation according to the operating amount of the brake operating member, and a control portion which calculates a target deceleration using hydraulic pressure in the stroke simulator.

According to this aspect of the invention, the target deceleration is calculated using the stroke simulator pressure. The stroke simulator is connected to the downstream side of the master cylinder via a simulator cut-off valve when viewed from the brake operating member side so that the master cylinder pressure is transmitted to the stroke simulator after a dynamic change in the master cylinder pressure due to a brake operation has been mitigated. Using the stroke simulator pressure thus enables the target deceleration to be calculated with less of an effect from a difference in operating speeds of the brake operating member. As a result, a change in the brake feeling can be inhibited, thus enabling a good brake feeling to be achieved.

The brake control system may also be provided with a master cylinder pressure sensor that measures hydraulic pressure in the master cylinder, and the control portion may calculate the target deceleration using an estimated value of the hydraulic pressure in the stroke simulator that is calculated based on the measured value from the master cylinder pressure sensor. According to this structure, the estimated value of the stroke simulator pressure is calculated based on the measured value from the master cylinder pressure sensor so there is no need to provide a separate sensor for measuring the stroke simulator pressure. As a result, the number of sensors does not increase which is preferable from the viewpoint of keeping costs down.

Moreover, the control portion may adjust the target deceleration by adjusting the estimated value of the hydraulic pressure in the stroke simulator. Accordingly, the estimated value of the stroke simulator pressure is corrected according to a difference in, for example, the operating speed of the brake operating member or vehicle type or the like, thereby enabling an adjusted target deceleration to be calculated. As a result, a brake feeling which is more suited to the situation can be achieved, which is preferable.

The control portion may calculate the target deceleration using a weighted average value of a measured value from master cylinder pressure sensor and the estimated value of the stroke simulator. Accordingly, the target deceleration is adjusted using the weighted average pressure P as a type of correction instead of the stroke simulator pressure. As a result, a brake feeling that is more suited to the situation can be achieved.

The brake control system may also include a simulator pressure sensor that measures the hydraulic pressure in the stroke simulator, and the control portion may calculate the target deceleration using the measured value from the simulator pressure sensor. According to this structure, a stroke simulator pressure that was actual measured is used which makes it possible to calculate the target deceleration with the effect from a difference in the operating speed of the brake operating member more reliably suppressed.

Further, the brake control system may also include a master cylinder pressure sensor that measures the hydraulic pressure in the master cylinder, and the control portion may calculate the target deceleration based on a weighted average value of the measured value from the master cylinder pressure sensor and the measured value from the simulator pressure sensor. According to this structure, the target deceleration can be adjusted according to a difference in the operating speed of the brake operating member or the type of vehicle, for example, by adjusting the weight when calculating the weighted average value of the measured value from the master cylinder pressure sensor and the measured value from the simulator pressure sensor. As a result, a brake feeling which is more suited to the situation can be achieved, which is preferable.

In this case, if an abnormality is detected in at least one of the master cylinder pressure sensor and the simulator pressure sensor, the control portion may set the weight for calculating the weighted average value to mitigate the effect from the abnormality. Accordingly, even if an abnormality were detected in a pressure sensor, the weight would be set to mitigate the effect from that abnormality. As a result, the target deceleration can be calculated with the effect from the abnormality mitigated, which is preferable from a failsafe viewpoint.

The brake control system may also be provided with a stroke sensor for measuring a pedal stroke of the operating member, and the control portion may calculate the target deceleration using a stroke from the measured value of the pedal stroke.

The control portion may calculate the target deceleration as a weighted average value of an first preliminary target deceleration that is based on the stroke and is obtained from the measured value of the pedal stroke and an second preliminary target deceleration that is based on the simulator pressure and is obtained from the estimated value of the stroke simulator pressure. That is, the target deceleration may be calculated by using at least one of the operating amount of the brake operating member and the master cylinder pressure, in addition to taking the stroke simulator pressure into account.

The control portion may also calculate the target deceleration a weighted average value of an first preliminary target deceleration that is based on the stroke and is obtained from the measured value of the pedal stroke and an third preliminary target deceleration that is based on a weighted average value of the measured value of the master cylinder pressure and the estimated value of the stroke simulator. By using the weighted average pressure the target deceleration can be adjusted from various viewpoints to achieve a brake feeling that is more suitable for the situation.

Another aspect of the invention relates to a method for controlling a brake system having a master cylinder that discharges pressurized operating fluid according to an operating amount of a brake operating member by a driver, and a stroke simulator which is connected to the master cylinder and creates a reaction force with respect to that operation according to the operating amount of the brake operating member. The method includes the step of calculating a target deceleration by using a hydraulic pressure in the stroke simulator.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a system diagram of a brake control system according to a first example embodiment of the invention;

DETAILED DESCRIPTION OF THE PREFERRED EMBODIMENTS

Figure 2:
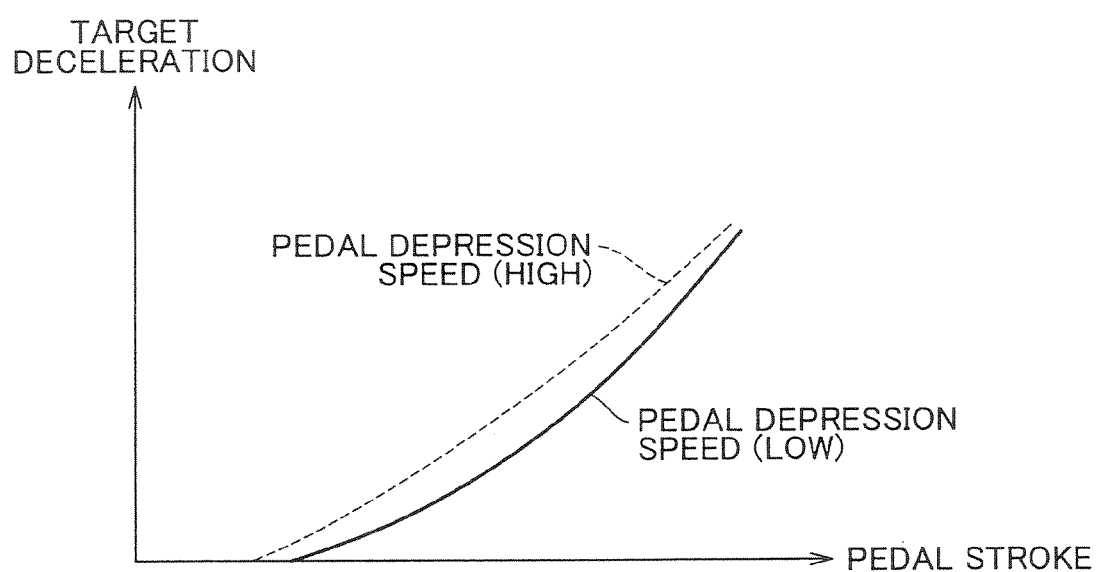
FIG. 2 is a representative view of the relationship between target deceleration and pedal stroke.

Hereinafter, example embodiments of the invention will be described in detail with reference to the drawings.

FIG. 1 is a system diagram of a brake control system 10 according to a first example embodiment of the invention. The brake control system 10 shown in the drawing is an electronically controlled brake system for a vehicle, which sets brakes for four wheels of the vehicle independently and optimally in response to an operation of a brake pedal 12, which serves as a brake operating member, by a driver.

The brake pedal 12 is connected to a master cylinder 14 which discharges brake fluid serving as the operating fluid in response to a depression operation by the driver. A stroke sensor 46 for detecting the depression stroke is provided on the brake pedal 12. A stroke simulator 24 which creates a reaction force according to the operating force on the brake pedal 12 by the driver is connected to one output port of the master cylinder 14. A simulator cut-off valve 23 is provided midway in a flow line that connects the master cylinder 14 with the stroke simulator 24. The simulator cut-off valve 23 is a normally closed electromagnetic check valve which is closed when de-energized and opens when an operation of the brake pedal 12 by the driver is detected. A reservoir tank 26 which stores brake fluid is connected to the master cylinder 14.

A brake hydraulic pressure control line 16 for the right front wheel is connected to one output port of the master cylinder 14. This brake hydraulic pressure control line 16 is connected to a wheel cylinder 20FR of a right front wheel, not shown, which applies braking force to the right front wheel. Also, a brake hydraulic pressure control line 18 for a left front wheel, not shown, is connected to the other output port of the master cylinder 14. This brake hydraulic pressure control line 18 is connected to a wheel cylinder 20FL of the left front wheel, which applies braking force to the left front wheel. A right electromagnetic check valve 22FR is provided midway in the brake hydraulic pressure control line 16 of the right front wheel and a left electromagnetic check valve 22FL is provided midway in the brake hydraulic pressure control line 18 of the left front wheel. The right electromagnetic check valve 22FR and the left electromagnetic check valve 22FL are both normally open electromagnetic valves which are open when de-energized and close when an operation of the brake pedal 12 by the driver is detected.

Also, a right master cylinder pressure sensor 48FR which detects the master cylinder pressure on the right front wheel side is provided midway in the brake hydraulic pressure control line 16 of the right front wheel. Similarly, a left master cylinder pressure sensor 48FL which measures the master cylinder pressure on the left front wheel side is provided midway in the brake hydraulic pressure control line 18 of the left front wheel. In this brake control system 10, when the driver depresses the brake pedal 12, not only is the amount of that depression operation detected by the stroke sensor 46, but the depression operating force (i.e., depression force) of the brake pedal 12 can also be obtained from the master cylinder pressure detected by the right master cylinder pressure sensor 48FR and the left master cylinder pressure sensor 48FL. In this way, assuming that the stroke sensor 46 may fail, monitoring the master cylinder pressure using two pressure sensors, i.e., the pressure sensors 48FR and 48FL, is preferable from the viewpoint of a failsafe. Hereinafter, the left and right master cylinder pressure sensors 48FL and 48FR will be referred to collectively as "master cylinder pressure sensors 48" where appropriate.

Meanwhile, one end of a hydraulic pressure supply and discharge conduit 28 is connected to the reservoir tank 26 and the other end of this hydraulic pressure supply and discharge conduit 28 is connected to an inlet of an oil pump 34 which is driven by a motor 32. An outlet of the oil pump 34 is connected to a high pressure conduit 30. This high pressure conduit 30 is also connected to an accumulator 50 and a relief valve 53. In this example embodiment, the oil pump 34 is a reciprocating pump which has two or more pistons, not shown, that are moved back and forth by the motor 32. Also, the accumulator 50 converts pressure energy from the brake fluid into pressure energy in a filler gas such as nitrogen and stores that pressure energy.

The accumulator 50 stores brake fluid that has been pressurized by the oil pump 34 to a pressure of around 14 to 22 MPa, for example. A valve outlet of the relief valve is connected to the hydraulic pressure supply and discharge conduit 28. If the pressure of the brake fluid in the accumulator 50 rises abnormally high, such as to a pressure of around 25 MPa, for example, the relief valve 53 opens, returning high pressure brake fluid to the hydraulic pressure supply and discharge conduit 28. Moreover, an accumulator pressure sensor 51 which detects an outlet pressure of the accumulator 50, i.e., the pressure of the brake fluid in the accumulator 50, is provided in the high pressure conduit 30.

This high pressure conduit 30 is connected to the wheel cylinder 20FR of the right front wheel via a pressure increase valve 40FR, the wheel cylinder 20FL of the left front wheel via a pressure increase valve 40FL, a wheel cylinder 20RR of a right rear wheel via a pressure increase valve 40RR, and a wheel cylinder 20RL of a left rear wheel via a pressure increase valve 40RL. Hereinafter, the wheel cylinders 20FR to 20RL will be collectively referred to as "wheel cylinders 20" where appropriate, and the pressure increase valves 40FL to 40RL will be collectively referred to as "pressure increase valves 40" where appropriate. The pressure increase valves 40 are all normally closed electromagnetic flow control valves (linear valves) which are closed when de-energized and used to increase the pressure in the wheel cylinders 20 as necessary. A disc brake unit is provided on each wheel of the vehicle, not shown. This disc brake unit generates braking force by using the operation of the wheel cylinder 20 to push a brake pad against a disc.

Also, the wheel cylinder 20FR of the right front wheel is connected to the hydraulic pressure supply and discharge conduit 28 via a pressure decrease valve 42FR and the wheel cylinder 20FL of the left front wheel is connected to the hydraulic pressure supply and discharge conduit 28 via a pressure decrease valve 42FL. These pressure decrease valves 42FR and 42FL are both normally closed electromagnetic flow control valves (linear valves) used to reduce the pressure in the wheel cylinders 20FR and 20FL as necessary. Meanwhile, the wheel cylinder 20RR of the right rear wheel is connected to the hydraulic pressure supply and discharge conduit 28 via a pressure decrease valve 42RR which is a normally open electromagnetic flow control valve. Similarly, the wheel cylinder 20RL of the left rear wheel is connected to the hydraulic pressure supply and discharge conduit 28 via a pressure decrease valve 42RL which is also a normally open electromagnetic flow control valve. Hereinafter, these pressure decrease valves 42FR to 42FL will collectively be referred to as "pressure decrease valves 42" where appropriate.

Provided near the wheel cylinders 20FR to 20RL of the right front wheel, the left front wheel, the right rear wheel and the left rear wheel are corresponding wheel cylinder pressure sensors 44FR, 44FL, 44RR, and 44RL, respectively, which detect a wheel cylinder pressure, i.e., the pressure of the brake fluid applied to the corresponding wheel cylinder 20. Hereinafter, these wheel cylinder pressure sensors 44FR to 44RL will collectively be referred to as "W/C pressure sensors 44" where appropriate.

The right and left electromagnetic check valves 22FR and 22FL, the pressure increase valves 40FR to 40RL, the pressure decrease valves 42FR to 42RL, the oil pump 34, and the accumulator 50 and the like together make up a hydraulic pressure actuator 80 of the brake control system 10. This hydraulic pressure actuator 80 is controlled by an electronic control unit (hereinafter referred to as "ECU") 200 which serves as a control portion in this example embodiment. The ECU 200 includes a CPU that executes various computations, ROM which stores various control programs, RAM which is used as a work area for storing data and executing programs, an input/output interface, memory, and the like.

The ECU 200 is electrically connected to the electromagnetic check valves 22FR and 22FL, the simulator cut-off valve 23, the pressure increase valves 40FR to 40RL, the pressure decrease valves 42FR to 42RL, and the like. Furthermore, the ECU 200 receives signals indicative of the wheel cylinder pressures in the wheel cylinders 20FR to 20RL from the W/C pressure sensors 44FR to 44RL. The ECU 200 also receives signals indicative of the pedal stroke of the brake pedal 12 from the stroke sensor 46, the master cylinder pressure from the right and left master cylinder pressure sensors 48FR and 48FL, and the accumulator pressure from the accumulator pressure sensor 51.

In the brake control system 10 structured in this way, the ECU 200 calculates a target deceleration of the vehicle from the depression stroke of the brake pedal 12 and the master cylinder pressure, and obtains a target wheel cylinder pressure for each wheel according to the calculated target deceleration. The ECU 200 then controls the wheel cylinder pressure in each wheel to match the target wheel cylinder pressure by controlling the pressure increase valves 40 and the pressure decrease valves 42.

Meanwhile, the electromagnetic check valves 22FR and 22FL are closed and the simulator cut-off valve 23 is open at this time. Therefore, when the driver depresses the brake pedal 12, brake fluid discharged from the master cylinder 14 flows through the simulator cut-off valve 23 and into the stroke simulator 24.

FIG. 2 is a representative view of the relationship between the target deceleration and the pedal stroke. The vertical axis in the drawing represents the target deceleration and the horizontal axis represents the pedal stroke. FIG. 2 representatively shows the relationship between a pedal stroke and a target deceleration that was calculated based on the master cylinder pressure and the pedal stroke. The solid line in the drawing shows the relationship between the two when the depression speed of the brake pedal 12 is low and the broken line shows the relationship between the two when the depression speed is high. Here, the depression speed refers to the amount of change in deceleration per unit time when a predetermined deceleration is applied to the vehicle by the brake pedal 12 being depressed. A high depression speed corresponds to a case in which the brake pedal 12 has been depressed suddenly, and a low depression speed corresponds to a case in which the brake pedal 12 has been depressed slowly.

As shown in FIG. 2, even if the pedal stroke is the same, the target deceleration tends to increase the greater the depression speed of the brake pedal 12. As a result, depression speed of the brake pedal 12 ends up affecting the brake feeling in such a way that the braking effect is felt more keenly the more suddenly the driver depresses the brake pedal 12. The reason for this is as follows.

The master cylinder 14 and the stroke simulator 24 are connected to each other via the flow line and the simulator cut-off valve 23 provided midway in the flow line as described above. When the brake pedal 12 is depressed and brake fluid flows from the master cylinder 14 to the stroke simulator 24, the simulator cut-off valve 23 acts to restrict the flow of brake fluid in the flow line.

Therefore, the transient response of the master cylinder pressure when the brake pedal 12 is depressed differs according to the depression speed of the brake pedal 12. That is, when the brake pedal 12 is depressed suddenly, the master cylinder pressure first rises to a relatively high pressure and then drops down to an equilibrium master cylinder pressure determined by the depression force as brake fluid flows out through the simulator cut-off valve 23 to the stroke simulator 24. When the brake pedal 12 is depressed slowly, on the other hand, the master cylinder pressure approaches the equilibrium master cylinder pressure without becoming all that high.

In order to generate the desired braking pressure when depressing the brake pedal 12, the master cylinder pressure is measured when the brake pedal 12 is depressed and a target deceleration is calculated. In this example embodiment, the master cylinder pressure sensor 48 for measuring the master cylinder pressure is provided upstream of the simulator cut-off valve 23. Therefore, the measured value from the master cylinder pressure sensor 48 when the brake pedal 12 is depressed is affected by the depression speed of the brake pedal 12. That is, the measured value of the master cylinder pressure immediately after the brake pedal 12 is depressed tends to become larger the more suddenly the brake pedal 12 is depressed. As a result, because the target deceleration is calculated to a value according to the magnitude of the master cylinder pressure, the target deceleration increases the greater the depression speed of the brake pedal 12, as shown in FIG. 2.

The effect that the depression speed of the brake pedal 12 has on the hydraulic pressure in the simulator 24 is not as great as the effect that it has on the master cylinder pressure. This is because the stroke simulator 24 is provided on the downstream side of the simulator cut-off valve 23. Therefore, in this example embodiment, the target deceleration is calculated using the stroke simulator. More specifically, an estimated value of the stroke simulator pressure is calculated from the measured value from the master cylinder pressure sensor 48, and target deceleration is then calculated using this estimated value.

Figure 3:
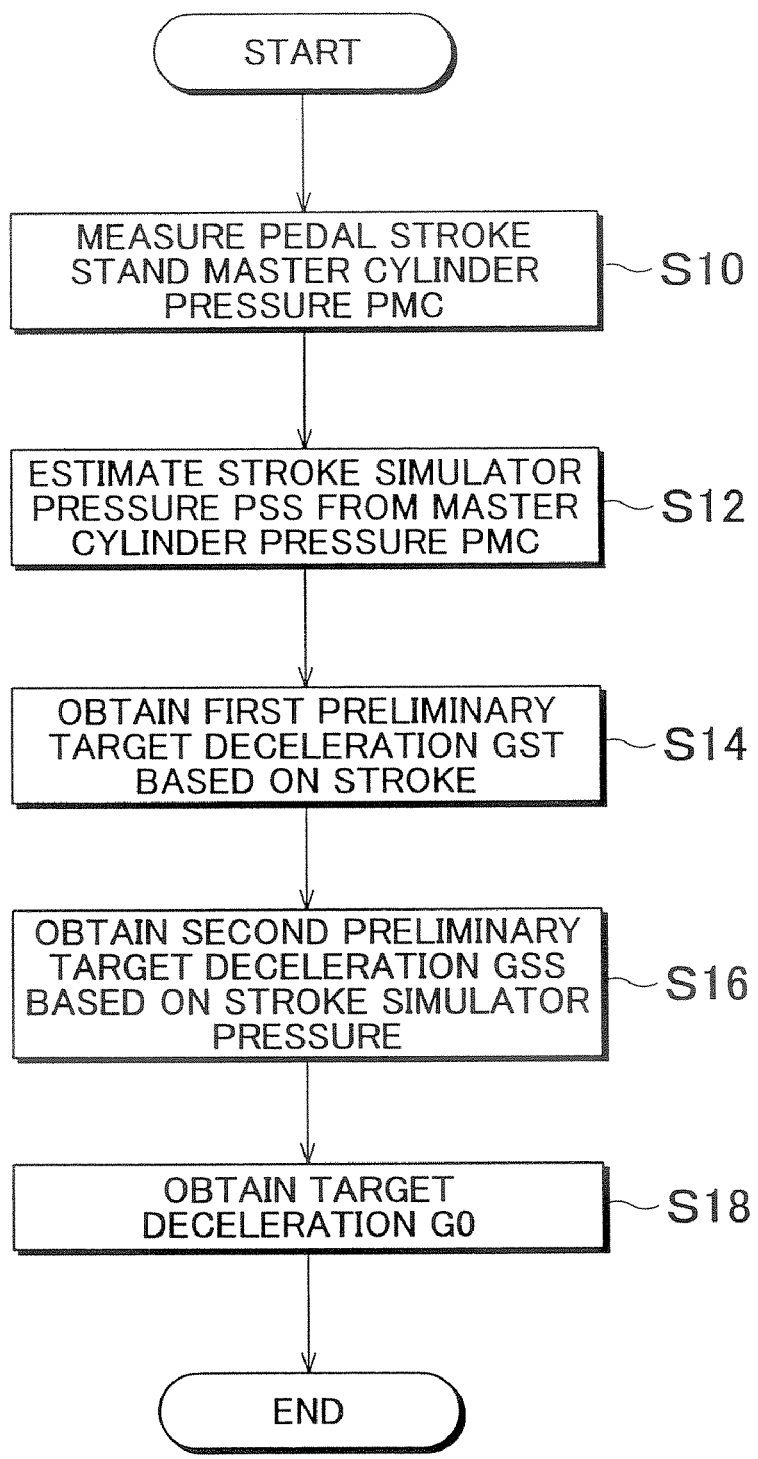
FIG. 3 is a flowchart illustrating a routine for calculating the target deceleration in the first example embodiment.

FIG. 3 is a flowchart of a routine for calculating the target deceleration according to the first example embodiment. This routine is executed by the ECU 200 at predetermined cycles during braking. When the routine starts, the ECU 200 first reads a pedal stroke ST measured by the stroke sensor 46 and a master cylinder pressure PMC measured by the master cylinder pressure sensor 48 (S10). Either one of the two measured values from the master cylinder pressure sensors 48 or an average value of the two measured values may be used as the measured value. Also, the signal indicative of the master cylinder pressure may be smoothed out by being passed through a filter as appropriate.

Next, the ECU 200 calculates an estimated value of a stroke simulator pressure PSS based on the master cylinder pressure PMC (S12). The estimated value of the stroke simulator pressure PSS is calculated from a line map of the relationship between the amount of brake fluid that has flowed into the stroke simulator 24 (hereinafter referred to as "consumed fluid amount VSS") and the stroke simulator pressure PSS. This line map shows the characteristics of the stroke simulator 24 and is stored in advance in storing means in the ECU 200. The ECU 200 calculates the consumed fluid amount VSS according to the following calculation formula using the master cylinder pressure PMC.

$$VSS = VSS(\text{last value}) + Q \times \Delta t$$

Here, Q is the volumetric flow rate per unit time in the simulator cut-off valve 23 and $\Delta t$ is the calculation cycle of the ECU 200. That is, the consumed fluid amount VSS is calculated by adding the product of the flow rate Q per unit time multiplied by the elapsed time $\Delta t$ according to calculation to the last VSS value calculated by the ECU 200. The flow rate Q per unit time is calculated according to the following expression.

$$Q = Cd \cdot Ag \cdot \text{sign}(\Delta P) \cdot \sqrt{2|\Delta P|/\rho} \qquad \text{[Expression 1]}$$

Here, Cd is a flow rate coefficient, Ag is the surface area of the restriction by the simulator cut-off valve 23, and $\rho$ is the density of the brake fluid. Also, $\Delta P$ is a value calculated as $\Delta P = PMC - PSS$ (last value) and represents the difference between the calculated value of the master cylinder pressure PMC and the last estimated value of the stroke simulator pressure PSS. $\text{sign}(\Delta P)$ represents the symbol of $\Delta P$, and is 1 when $\Delta P$ is a positive value or zero, and $-1$ when $\Delta P$ is a negative value.

Figure 4:
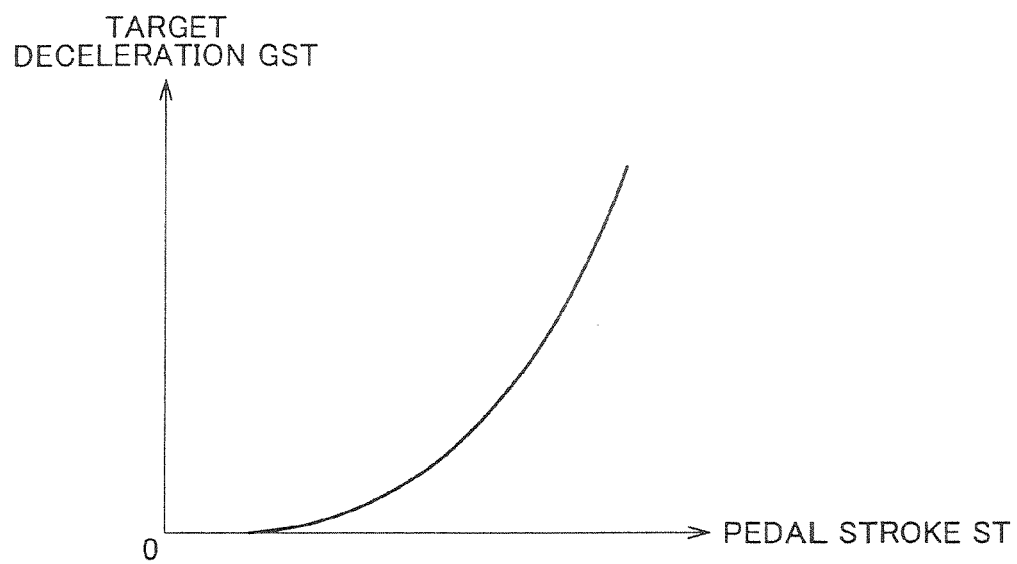
FIG. 4 is a view of one example of the relationship between a pedal stroke ST and a first preliminary target deceleration GST that is based on the stroke.

Once the estimated value of the stroke simulator pressure PSS is obtained, the ECU 200 then obtains a first preliminary target deceleration GST that is based on the stroke, from the measured value of the pedal stroke ST (S14). The relationship between the pedal stroke ST and the first preliminary target deceleration GST that is based on the stroke is mapped out beforehand and stored in the ECU 200. FIG. 4 is a view of one example of the relationship between the pedal stroke ST and the first preliminary target deceleration GST that is based on the pedal stroke ST. In FIG. 4, the relationship between the two is set such that the rate of increase in the first preliminary target deceleration GST increases as the pedal stroke ST increases.

Figure 5:
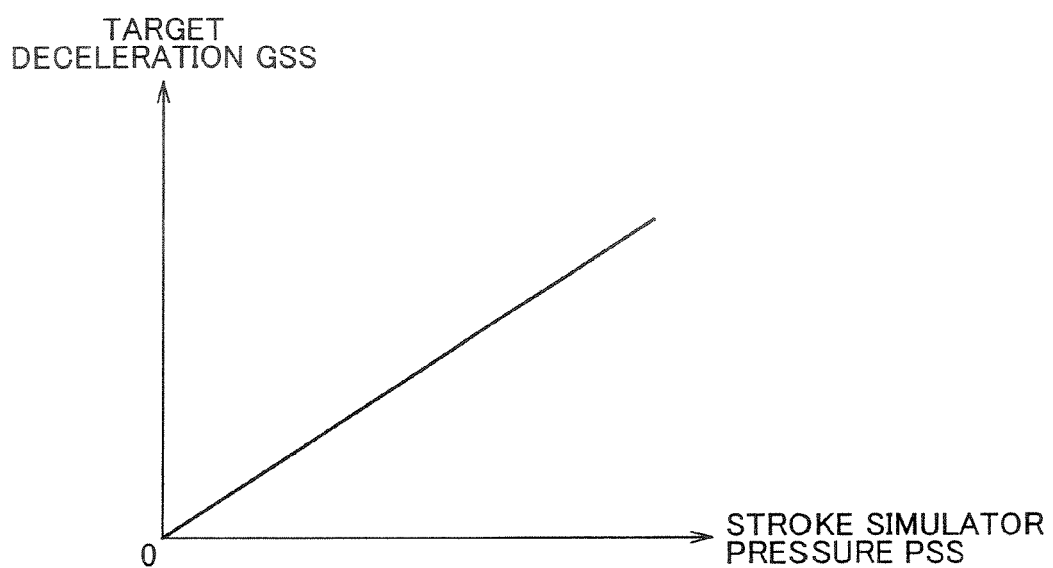
FIG. 5 is a view of one example of the relationship between a stroke simulator pressure PSS and a second preliminary target deceleration GSS that is based on the simulator pressure.

Further, the ECU 200 then obtains a second preliminary target deceleration GSS that is based on the simulator pressure, from the estimated value of the stroke simulator pressure PSS (S16). The relationship between the stroke simulator pressure PSS and the second preliminary target deceleration GSS that is based on the simulator pressure is similarly mapped out beforehand and stored in the ECU 200. FIG. 5 is a view of one example of the relationship between the stroke simulator pressure PSS and the second preliminary target deceleration GSS that is based on the simulator pressure. In FIG. 5, the relationship between the two is set such that the stroke simulator pressure PSS and the second preliminary target deceleration GSS are almost linear.

The ECU 200 then calculates a target deceleration G0 according to the following expression, as a weighted average value of the first and second preliminary target decelerations GST and GSS described above (S18).

$$G0 = A \times GST + (1-A) \times GSS$$

Here, coefficient A is the weight for the first preliminary target deceleration GST that is based on the stroke and is a value between 0 and 1, inclusive. The ECU 200 calculates the coefficient A based on the value of the last target deceleration G0. The relationship between the value of the target deceleration G0 and the coefficient A is set beforehand and stored in the ECU 200.

Once the target deceleration G0 is calculated, the ECU 200 ends the routine shown in FIG. 3. After the target deceleration G0 is calculated, the ECU 200 then calculates the target hydraulic pressure in each wheel cylinder 20 based on the target deceleration G0 and controls the pressure increase valves 40 and pressure decrease valves 42 so that the wheel cylinder pressures match the target hydraulic pressures.

As described above, in this example embodiment, the target deceleration is calculated using the stroke simulator pressure estimated from the master cylinder pressure. The master cylinder pressure is transmitted to the stroke simulator 24 with fluctuations in the master cylinder pressure due to differences in the depression speed of the brake pedal 12 being mitigated by the simulator cut-off valve 23. Accordingly, fluctuations in the target deceleration due to differences in the depression speed of the brake pedal 12 are suppressed, thus enabling a good brake feeling to be achieved.

Also, the stroke simulator pressure is estimated from the master cylinder pressure so there is no need to further provided a pressure sensor for measuring the stroke simulator pressure. As a result, an increase in cost of the brake control system that would otherwise occur due to an increase in the number of sensors can be suppressed while a good brake feeling is able to be achieved.

The brake control system according to this example embodiment includes a control portion that calculates the target deceleration based on at least one of the operating amount of the brake operating member by the driver and the hydraulic pressure in the master cylinder that fluctuates according to the operation of the brake operating member, and a stroke simulator which is connected to the master cylinder and creates a reaction force with respect to that operation according to the operating amount. The control portion calculates the target deceleration taking into account the hydraulic pressure in the stroke simulator.

That is, in this example embodiment, the target deceleration is calculated by using at least one of the operating amount of the brake operating member and the master cylinder pressure, in addition to taking the stroke simulator pressure into account. The stroke simulator is connected to the downstream side of the master cylinder via the simulator cut-off valve 23 when viewed from the brake operating member side so the master cylinder pressure is transmitted to the stroke simulator after a dynamic change in the master cylinder pressure due to a brake operation has been mitigated by the simulator cut-off valve 23. Accordingly, by taking the stroke simulator pressure into account the target deceleration can be calculated with less of an effect from the difference in operating rate of the brake operating member. As a result, a change in the brake feeling can be inhibited so a good brake feeling can be achieved.

Continuing on, a second example embodiment of the invention will now be described. This second example embodiment differs from the first example embodiment in that the estimated value of the stroke simulator pressure is appropriately corrected and then used to calculate the target deceleration. Because the target deceleration can be adjusted by correcting the estimated value of the stroke simulator pressure, a brake feeling that is more suitable for the situation can be achieved. In the following description, the parts of the second example embodiment that are the same as parts of the first example embodiment will be omitted as appropriate.

In the second example embodiment, in order to correct the estimated value of the stroke simulator pressure, Q' which is expressed by the following expression will be used instead of the flow rate Q per unit time of the first example embodiment, for example.

$$Q' = H \times Q$$

Figure 6:
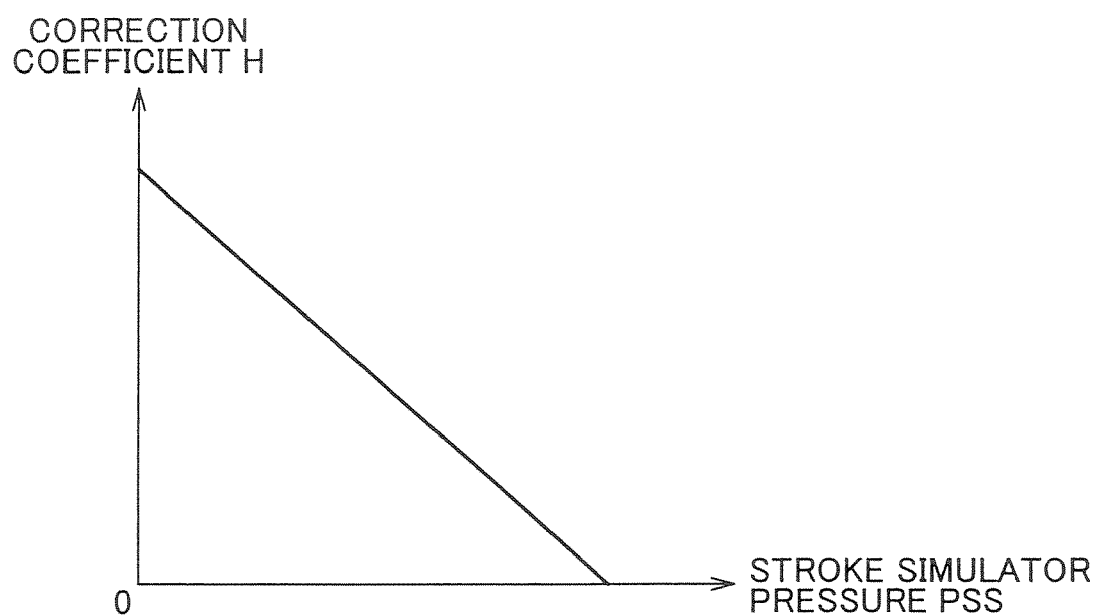
FIG. 6 is a view of one example of the relationship between a stroke simulator pressure PSS and a correction coefficient H according to a second example embodiment.

Here, H is a correction coefficient which is set beforehand as shown in FIG. 6, for example, and stored in the ECU 200. That is, the flow rate Q' per unit time in the second example embodiment is calculated as the product of the correction coefficient H multiplied by the flow rate Q per unit time of the first example embodiment.

FIG. 6 is a view of one example of the relationship between the correction coefficient H and the stroke simulator pressure PSS. In the drawing, the correction coefficient H is set to decrease as the stroke simulator pressure PSS increases. Also, the correction coefficient H and the stroke simulator pressure are set so as to be substantially linear in this example. In this example embodiment, the correction coefficient H is set with respect to the stroke simulator pressure PSS, but it can alternatively be set with respect to the master cylinder pressure PMC.

By setting the correction coefficient H in this way, it becomes relatively large when the stroke simulator pressure PSS is relatively small. Accordingly, the estimated value of the stroke simulator pressure PSS follows the fluctuations in the master cylinder pressure relatively precisely and can be adjusted so that the target deceleration can also be calculated relatively precisely. As a result, responsiveness of the deceleration that is actually generated can be made relatively sensitive.

Conversely, when the stroke simulator pressure PSS is relatively large, the correction coefficient H is relatively small. Accordingly, the sensitivity of the estimated value of the stroke simulator pressure PSS to fluctuations in the master cylinder pressure becomes less such that the estimated value of the stroke simulator pressure PSS becomes a more stable response with respect to the master cylinder pressure. As a result, the target deceleration can also be adjusted to fluctuate more stably, thereby enabling the responsiveness of the deceleration that is actually generated to be more stable.

The stroke simulator pressure PSS increases or decreases according to an increase or decrease in the depression force that the driver exerts on the brake pedal 12. Also, with a brake operation during normal driving, a small depression force is quite frequent whereas a large depression force is rather infrequent. Therefore, by setting the correction coefficient H as described above, the responsiveness of the brake when the braking force is small, which is quite frequent, is able to be made quite sensitive and the stability of the brake response when the depression force is large, which is less frequent, is able to be increased.

As described above, in this second example embodiment, the target deceleration is adjusted by correcting the estimated value of the stroke simulator pressure PSS, thereby enabling a brake feeling that is appropriate for the situation to be achieved.

In the foregoing description, the flow rate per unit time is corrected, but another parameter can also be corrected. For example, the differential pressure between the master cylinder pressure and the stroke simulator pressure may be corrected as in the expression $\Delta P'=H\times\Delta P$, or the flow rate coefficient Cd, the sectional area Ag, the calculation cycle $\Delta t$ or the like may be corrected.

Also in the second example embodiment, the correction was made to achieve a more suitable brake feeling from the viewpoint of the frequency of the magnitude of the depression force generated, but the invention is not limited to this. For example, a correction may be made according to a difference in vehicle type, brake sensitivity preferred by the driver, or vehicle destination or a correction that is suitable from another perspective may be made. In any of these cases, the correction amount to make the brake feeling in the particular case better is preferably set appropriately through testing or the like.

A correction can also be made which is different when the brake pedal 12 is depressed than it is when the brake pedal 12 is released. That is, even if the stroke simulator pressure PSS is the same, the correction coefficient H can be set differently when the pedal stroke is increased than it is when the pedal stroke is decreased. Accordingly, the fluctuation in the deceleration can be made to be slower when the brake pedal 12 is released than when it is depressed. In this case, it is possible to distinguish between when the brake pedal 12 is being depressed from when the brake pedal 12 is being released by, for example, having the ECU 200 calculate the difference between the target deceleration calculated this time and the target deceleration calculated last time and making the determination based on a symbol of that difference. Alternatively, the determination may be made based on the symbol of the differential pressure $\Delta P$ between the master cylinder pressure and the stroke simulator pressure.

Next, a third example embodiment of the invention will be described. The third example embodiment differs from the other example embodiments in that it uses a weighted average value of the measured value of the master cylinder pressure PMC and the estimated value of the stroke simulator pressure PSS. In the following description, the parts of the third example embodiment that are the same as parts of the first example embodiment will be omitted as appropriate.

Figure 7:
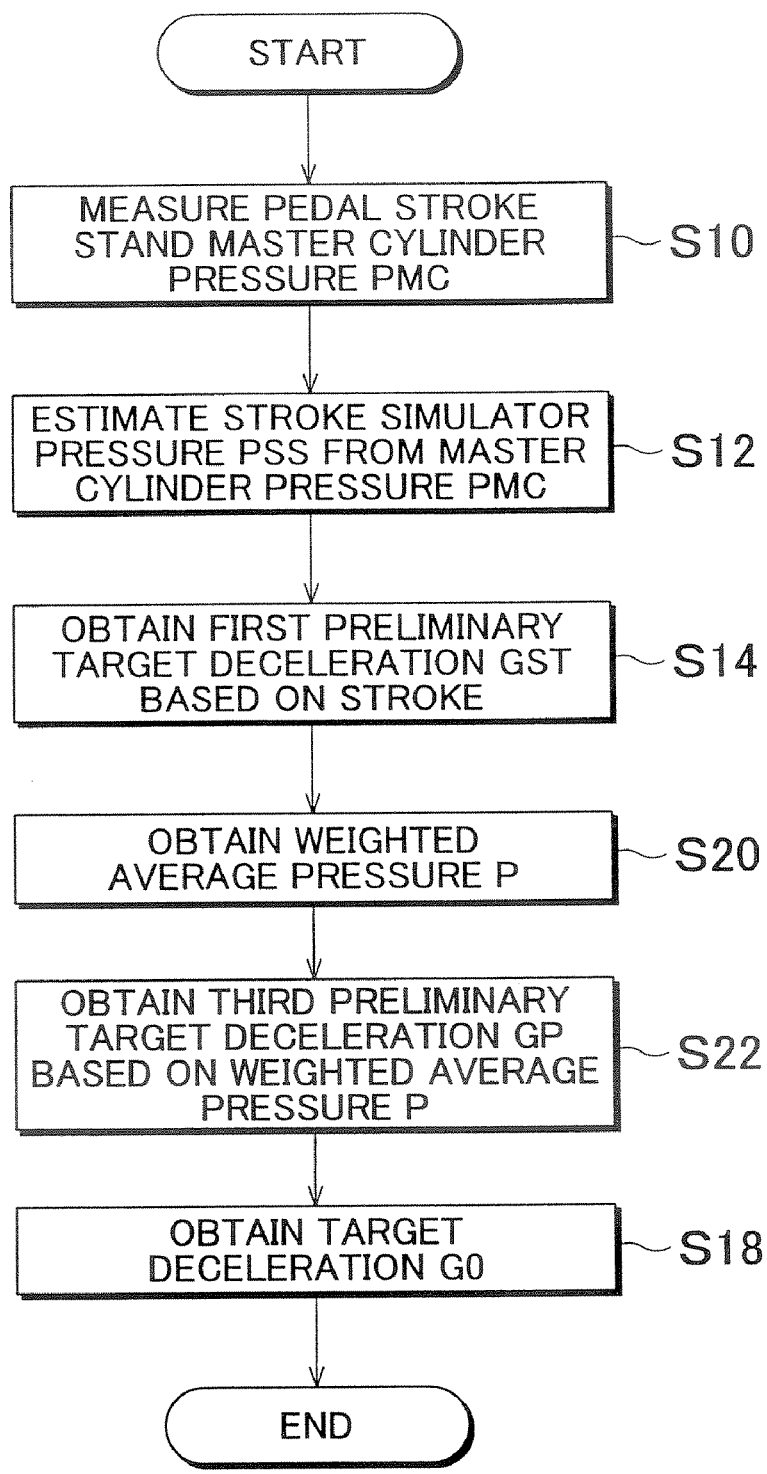
FIG. 7 is a flowchart illustrating a routine for calculating the target deceleration according to a third example embodiment.

FIG. 7 is a flowchart illustrating a routine for calculating the target deceleration according to the third example embodiment. The routine shown in FIG. 7 is executed by the ECU 200 at predetermined cycles during braking. In the routine in the drawing, the steps from the start of the routine up to step S14 are the same as those described in the first example embodiment with reference to FIG. 3 so descriptions thereof will be omitted here.

Once the first preliminary target deceleration GST that is based on the pedal stroke ST is calculated (S14), the ECU 200 then calculates a weighted average pressure P, which is the weighted average value of the measured value of the master cylinder pressure PMC and the estimated value of the stroke simulator pressure PSS, according to the following expression (S20).

$$P=\alpha\times PMC+(1-\alpha)\times PSS$$

Here, coefficient $\alpha$ is the weight for the master cylinder pressure PMC and is a value between 0 and 1, inclusive. The ECU 200 calculates the coefficient $\alpha$ based on a map set and stored beforehand.

Similar to the correction coefficient H in the second example embodiment, the coefficient $\alpha$ can be set from various viewpoints to achieve a brake feeling that is more suitable for the situation. For example, similar to the second example embodiment, the coefficient $\alpha$ may be set to decrease as the stroke simulator pressure PSS increases. Accordingly, the weight for the master cylinder pressure PMC becomes larger the smaller the stroke simulator pressure PSS. Therefore, the responsiveness of the brake when the depression force is small, which is more frequent, is relatively sensitive, and the stability of the brake response when the depression force is large, which is less frequent, can be improved.

Once the weighted average pressure P is calculated, the ECU 200 then obtains a third preliminary target deceleration GP that is based on the weighted average pressure P (S22). The relationship between the weighted average pressure P and the third preliminary target deceleration GP that is based on the weighted average pressure is mapped out beforehand and stored in the ECU 200, similar to the first example embodiment. Then, the ECU 200 calculates a target deceleration G0 as a weighted average value of the first preliminary target deceleration GST that is based on the stroke and the target deceleration third preliminary GP that is based on the weighted average pressure (S18).

As described above, in the third example embodiment, the target deceleration G0 is adjusted using the weighted average pressure P as a type of correction instead of the stroke simulator pressure PSS. As a result, a brake feeling that is more suited to the situation can be achieved.

Moreover, a fourth example embodiment of the invention will now be described. This fourth example embodiment differs from the other example embodiments in that it uses a measured value instead of the estimated value as the stroke simulator pressure PSS. In the following description, the parts of the fourth example embodiment that are the same as parts of the first example embodiment will be omitted as appropriate.

Figure 8:
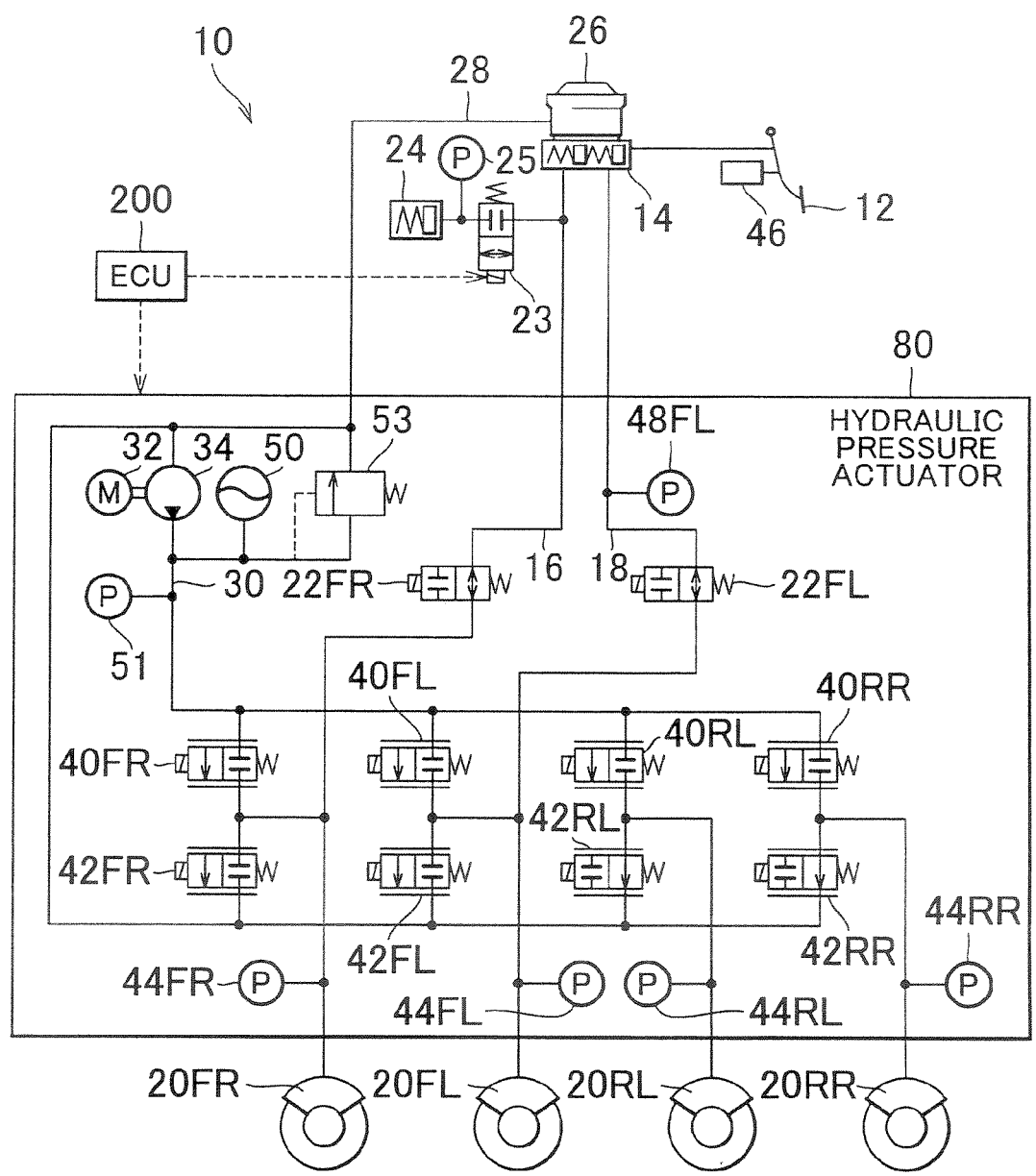
FIG. 8 is a system diagram of a brake control system according to a fourth example embodiment of the invention.

FIG. 8 is system diagram of a brake control system 10 according to the fourth example embodiment of the invention. As shown in the drawing, the brake control system 10 according to the fourth example embodiment is provided with a simulator pressure sensor 25 for measuring the hydraulic pressure in the stroke simulator 24. The simulator pressure sensor 25 is provided midway in a flow line that connects the simulator cut-off valve 23 with the stroke simulator 24.

Also, in the first example embodiment, the right master cylinder pressure sensor 48FR is provided between the master cylinder 14 and the right electromagnetic check valve 22FR. In the brake control system 10 according to the fourth example embodiment, however, the right master cylinder pressure sensor 48FR is omitted. In the fourth example embodiment, the master cylinder pressure PMC is measured instead by the left master cylinder pressure sensor 48FL. Compared with the first example embodiment which uses the estimated value of the stroke simulator pressure PSS, the structure of the fourth example embodiment enables the stroke simulator pressure PSS to be measured but without increasing the number of pressure sensors. This structure is therefore preferable in that the number of pressure sensors is not increased, which keeps the cost of the brake control system down.

The target deceleration in the fourth example embodiment is calculated by the same method (i.e., routine) used in the third example embodiment described with reference to FIG. 7. However, instead of using the estimated value of the stroke simulator pressure PSS as in the third example embodiment, in the fourth example embodiment the measured value of the stroke simulator pressure PSS that was actually measured by the simulator pressure sensor 25 is used. The ECU 200 calculates the weighted average pressure P using the measured value together with both the master cylinder pressure PMC and the stroke simulator pressure PSS, and then calculates the target deceleration. In this case, a brake feeling that is more suitable for the situation can be achieved by appropriately setting the coefficient α, similar to the third example embodiment.

Also, in the fourth example embodiment, when an abnormality is detected, the ECU 200 calculates the target deceleration to mitigate the effect from the abnormality. As an example in this example embodiment, the ECU 200 calculates a target deceleration that mitigates the effect from the abnormality by setting the coefficient α for calculating the weighted average pressure P according to the detected abnormality.

For example, if an abnormality is detected in the left master cylinder pressure sensor 48FL, the ECU 200 sets the coefficient α to 0, for example, regardless of the value of the stroke simulator pressure PSS. Accordingly, the abnormal measured value from the left master cylinder pressure sensor 48FL is not reflected in the calculation of the weighted average pressure P so the weighted average pressure P becomes equal to the stroke simulator pressure PSS. As a result, the effect from the abnormality can be eliminated.

If, on the other hand, an abnormality is detected in the simulator pressure sensor 25, the ECU 200 sets the coefficient α to 1, for example. Accordingly, the abnormal measured value from the simulator pressure sensor 25 is not reflected in the calculation of the weighted average pressure P so the weighted average pressure P becomes equal to the master cylinder pressure PMC. As a result, the effect from the abnormality can be eliminated.

Also, if it is difficult to determine which of the sensors, i.e., the master cylinder pressure sensor 48 or the simulator pressure sensor 25, an abnormality has occurred in, the ECU 200 may set the coefficient α to 0.5, for example. Alternatively, the ECU 200 may set the coefficient α so that the weight becomes less for the measured value from the pressure sensor that is thought most likely to be the pressure sensor in which the abnormality has occurred. Accordingly, the effect on the weighted average pressure P from the abnormal measured value can be mitigated.

It is possible to detect whether an abnormality has occurred in either the master cylinder pressure sensor or the simulator pressure sensor 25 by using pressure sensors which have a self-diagnostic function for disconnections and shorts in the sensors themselves. Alternatively, the ECU 200 can also detect the occurrence of an abnormality when the response of the master cylinder pressure PMC or the stroke simulator pressure PSS is abnormally slow with respect to the detected value from the stroke sensor 46 when the driver operates the brake pedal 12.

The effect from an abnormality can be mitigated by appropriately setting the coefficient α similarly also in a case where an abnormality occurs somewhere other than in a pressure sensor. For example, if the simulator cut-off valve 23 fails to close or if there is abnormality in the stroke simulator 24, the measured value from the simulator pressure sensor 25 can be prevented from being reflected in the calculation of the weighted average pressure P and the effect of that abnormality eliminated by setting the coefficient α to 1.

As described above, in the fourth example embodiment, the target deceleration is calculated using the stroke simulator pressure that was actually measured by the simulator pressure sensor 25. As a result, the effect that the depression speed of the brake pedal 12 has on the target deceleration can be more reliably suppressed. Also, the coefficient α for calculating the weighted average pressure P is set to mitigate the effect from an abnormality if an abnormality occurs. As a result, the failsafe ability can be further improved.

Although the invention has been described herein with reference to specific embodiments, it is not limited to those example embodiments. Many modifications and variations therein will readily occur to those skilled in the art. Accordingly, all such variations and modifications are included within the intended scope of the invention.

What is claimed is:

1. A brake control system comprising:
    a master cylinder that discharges pressurized operating fluid according to an operating amount of a brake operating member by a driver;
    a stroke simulator which is connected to the master cylinder and creates a reaction force with respect to that operation according to the operating amount of the brake operating member;
    a control portion which calculates a target deceleration using a hydraulic pressure in the stroke simulator; and
    a master cylinder pressure sensor that measures a hydraulic pressure in the master cylinder,
    wherein the control portion calculates the target deceleration using an estimated value of the hydraulic pressure in the stroke simulator that is calculated based on a measured value from the master cylinder pressure sensor, and
    wherein the estimated value of the hydraulic pressure in the stroke simulator is calculated from a line map of a relationship between an amount of fluid that has flowed into the stroke simulator and the hydraulic pressure in the stroke simulator.

2. The brake control system according to claim 1, wherein the control portion adjusts the target deceleration by correcting the estimated value of the hydraulic pressure in the stroke simulator.

3. The brake control system according to claim 1, wherein the control portion calculates the target deceleration using a weighted average value of a measured value from the master cylinder pressure sensor and the estimated value of the stroke simulator.

4. The brake control system according to claim 1, further comprising
    a stroke sensor for measuring a pedal stroke,
    wherein the control portion calculates the target deceleration using a stroke from the measured value of the pedal stroke.

5. The brake control system according to claim 4, wherein the control portion calculates the target deceleration as a weighted average value of a first preliminary target deceleration that is based on the stroke and is obtained from the measured value of the pedal stroke and a second preliminary target deceleration that is based on the simulator pressure and is obtained from the estimated value of the stroke simulator pressure.

6. The brake control system according to claim 4, wherein the control portion calculates the target deceleration as a weighted average value of a first preliminary target deceleration that is based on the stroke and is obtained from the measured value of the pedal stroke and a third preliminary target deceleration that is based on a weighted average value of the measured value of the master cylinder pressure and the estimated value of the stroke simulator.

7. A method for controlling a brake system having a master cylinder that discharges pressurized operating fluid according to an operating amount of a brake operating member by a driver, and a stroke simulator which is connected to the master cylinder and creates a reaction force with respect to that operation according to the operating amount of the brake operating member, comprising:

calculating a target deceleration by using a hydraulic pressure in the stroke simulator;

measuring a master cylinder pressure;

estimating a stroke simulator pressure from the master cylinder pressure using a line map of a relationship between an amount of fluid that has flowed into the stroke simulator and the hydraulic pressure in the stroke simulator; and obtaining the target deceleration using an estimated value of the stroke simulator pressure.

8. The method for controlling a brake system according to claim 7, further comprising:

measuring a pedal stroke;

obtaining a first preliminary target deceleration based on the pedal stroke;

obtaining a second preliminary target deceleration based on the stroke simulator pressure; and obtaining the target deceleration based on the first preliminary target deceleration and the second preliminary target deceleration.

9. The method for controlling a brake system according to claim 7, further comprising:

adjusting the target deceleration by correcting the estimated value of the stroke simulator pressure.

10. The method for controlling a brake system according to claim 7, further comprising:

measuring a pedal stroke;

obtaining a first preliminary target deceleration based on the pedal stroke;

obtaining a weighted average pressure based on the measured value of the master cylinder pressure and the estimated value of the stroke simulator pressure;

obtaining a third preliminary target deceleration based on the weighted average pressure; and obtaining a target deceleration based on the first preliminary target deceleration and the third preliminary target deceleration.

11. The method for controlling a brake system according to claim 10, further comprising:

if an abnormality is detected in at least one of a master cylinder pressure sensor and a simulator pressure sensor, setting a weight for calculating the weighted average value according to the detected abnormality to mitigate an effect from the abnormality.

12. The brake control system according to claim 1, wherein the amount of fluid that has flowed into the stroke simulator is calculated based on a previous amount of fluid that has flowed into the stroke simulator and a calculated volumetric flow rate per unit time in a simulator cut-off valve.

13. The brake control system according to claim 12, wherein the calculated volumetric flow rate per unit time in the simulator cut-off valve is a function of a surface area of a restriction of the simulator cut-off valve and a pressure differential between the measured value from the master cylinder pressure sensor and a previous estimated value of the hydraulic pressure in the stroke simulator.

* * * * *